United States Patent [19]

Greco et al.

[11] 3,862,203

[45] Jan. 21, 1975

[54] PROCESS OF MANUFACTURING NITRILOTRIACETONITRILE

[75] Inventors: Carl C. Greco, Garnerville; Walter Stamm, Carmel, both of N.Y.

[73] Assignee: Stauffer Chemical Company, New York, N.Y.

[22] Filed: May 11, 1970

[21] Appl. No.: 36,390

Related U.S. Application Data

[63] Continuation-in-part of Ser. No. 691,244, Dec. 18, 1967, abandoned.

[52] U.S. Cl. ......................................... 260/465.5 A
[51] Int. Cl. ............................................ C07c 121/42
[58] Field of Search ............................. 260/465.5 A

[56] References Cited
UNITED STATES PATENTS

| 2,794,044 | 5/1957 | Miller ....................... 260/465.5 |
| 2,855,428 | 10/1958 | Singer et al. ............... 260/465.5 |
| 3,061,628 | 10/1962 | Singer, Jr. et al. ......... 260/465.5 |
| 3,167,580 | 1/1965 | Saunders et al. ........... 260/465.5 |
| 3,167,581 | 1/1965 | Saunders et al. ........... 260/465.5 |
| 3,167,582 | 1/1965 | Saunders et al. ........... 260/465.5 |
| 3,256,314 | 6/1966 | Dovell et al. ............... 260/465.5 |
| 3,337,607 | 8/1967 | Wollensak ................... 260/465.5 |
| 3,412,137 | 11/1968 | Stutts ........................... 260/465.5 |
| 3,424,783 | 1/1969 | Harper et al. ............... 260/465.5 |
| 3,463,805 | 8/1969 | Morgan et al. .............. 260/465.5 A |
| 3,515,742 | 6/1970 | Morgan et al. .............. 260/465.5 A |
| 3,637,799 | 1/1972 | Herz ............................. 260/465.5 A |
| 3,679,728 | 7/1972 | Morgan et al. .............. 260/465.5 A |
| 3,679,729 | 7/1972 | Daniels ........................ 260/465.5 A |

FOREIGN PATENTS OR APPLICATIONS

| 974,787 | 11/1964 | Great Britain .................. 260/465.5 |
| 1,159,959 | 12/1963 | Germany ........................ 260/465.5 |

OTHER PUBLICATIONS

Rinehart, J.A.C.S., 48 (1926), pp. 2794–2798.
Derwent Belgian Patent Reports No. 44/67, pp. 5:3 and 5:4, report of 11–29–67.

*Primary Examiner*—Joseph P. Brust

[57] ABSTRACT

A process of manufacturing nitrilotriacetonitrile in a two step single phase continuous operation wherein ammonia, formaldehyde, and hydrogen cyanide in approximately stoichiometric portions are reacted together in a first reactor to form methylene diaminotetraacetonitrile. The methylene diaminotetraacetonitrile is then continuously conveyed to a second reactor maintained at a temperature of at least above 100° C., and under pressure and contacted with additional formaldehyde and hydrogen cyanide for a period of from 3 to 15 minutes to form nitrilotriacetonitrile.

11 Claims, No Drawings

PROCESS OF MANUFACTURING NITRILOTRIACETONITRILE

CROSS REFERENCE TO RELATED APPLICATION

This application is a continuation-in-part of Ser. No. 691,244, filed Dec. 18, 1967, titled PROCESS OF MANUFACTURING NITRILOTRIACETONITRILE, now abandoned.

BACKGROUND OF THE INVENTION

Nitrilotriacetonitrile (hereinafter referred to as NTN) is an old and well known composition and may be described as a white crystalline solid having a melting point of between 126°–128°C., that is substantially insoluble in water. This material finds use as a reactive intermediate.

Prior processes for manufacturing the NTN involve the reaction of ammonia, formaldehyde, and hydrogen cyanide in the presence of a mineral acid. The ingredients were usually introduced into a reaction vessel and agitated with a stirring mechanism to bring about intimate contact of the various components. The reaction of these components is carried out at atmospheric pressure at a temperature ranging from room temperature up to 80°C. Under these prevailing reaction conditions, the reaction medium becomes hetergeneous, with the continual formation of solid intermediates and products. When these components are reacted together at room temperature, the NTN is formed within three to six days. However, at the upper level of 75°C., this time can be reduced to four to five hours. When the reaction is complete, the NTN in a crystalline form, can be recovered and after washing in good yields.

Various alternatives have been proposed, one of which involves the reaction of ammonia and formaldehyde to form hexamethylenetetraamine. The hexamethylenetetraamine is then introduced into a reaction vessel and agitated with hydrogen cyanide and additional formaldehyde in the presence of a mineral acid to form NTN as the end product. Again, these reactions take place at either room temperature or up to 80°C., resulting in a heterogeneous medium. Also, at these temperatures the formation of NTN from the reaction products takes from 3 to 5 hours, also in relatively good yields.

Another method of forming the NTN product is to react ammonium sulfate, formaldehyde and hydrogen cyanide in an aqueous acidic medium to form NTN. However, this reaction is even more sluggish than the previous method. Moreover, because of the long reaction time requirements, and because of the heterogeneous nature of the reaction, all the known methods of forming NTN are limited to batch process operations at temperatures of up to 80°C., and at atmospheric pressure. At these temperatures and pressures, the large in-process inventories of hydrogen cyanide necessitates the use of especially designed safety equipment to maintain control of the highly exothermic reaction and volatility of the unreacted hydrogen cyanide. These precautions must be maintained because of the highly toxic nature of the material employed. This, of course, requires a large capital investment. Moreover, the time involved of up to four to five hours to produce a commercial yield of the NTN product materially increases the cost thereof. Thus, there is a need in the industry for forming the NTN composition at materially reduced rates or times, yet retaining the high yield of over 80 percent necessary for commercialization.

One method proposed for preparing NTN is described in U.S. Ser. No. 630,875, now abandoned. The application disclosed the preparation of methylene diaminotetraacetonitrile followed by the reaction methylene diaminotetraacetonitrile with formaldehyde and hydrogen cyanide to form NTN. The present process is an improvement in the process disclosed in U.S. Ser. No. 630,875.

BRIEF DESCRIPTION OF THE INVENTION

It has been discovered that nitrilotriacetonitrile can be manufactured in a two step operation wherein an intermediate is formed by reacting amomonia, formaldehyde, and hydrogen cyanide in the presence of a mineral acid to form methylene diaminotetraacetonitrile. This intermediate product is then admixed with additional hydrogen cyanide and formaldehyde and heated at a temperature of at least above 100°C. and under pressure for a period of from 3 to 15 minutes.

DETAILED DESCRIPTION OF THE INVENTION

In the practice of the present invention, ammonia, formaldehyde and hydrogen cyanide are reacted together under aqueous acid conditions to form methylene diaminotetraacetonitrile. The manner in which this intermediate product is manufactured is well known as set forth in J.A.C.S. 48, 2794 (1926) and German Pat. No. 1,159,959 and United States application Ser. No. 630,875. This intermediate product is formed in situ by heating the reactants together for about 5 minutes and at a temperature of between 50° and 100° C. Formaldehyde and hydrogen cyanide should be present in an amount stoichiometrically sufficient to react the ammonia to methylene diaminotetraacetonitrile. An excess of formaldehyde and hydrogen cyanide has been found to be advantageous.

Thereafter, and without isolating the intermediate product, the methylene diaminotetraacetonitrile is reacted with at least approximately stoichiometric portions of additional hydrogen cyanide and formaldehyde to give excellent yields of nitrilotriacetonitrile, in accordance with the following reaction:

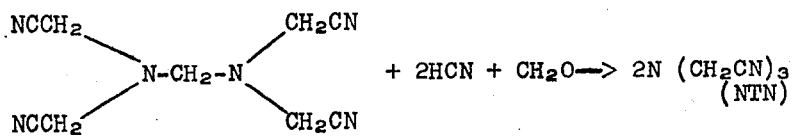

The reaction conditions for converting the intermediate product, methylene diaminotetraacetonitrile to the NTN product is at a temperature of at least 100° C., and under pressure, preferably autogeneous pressure. The upper limit of temperature under the reaction conditions would be approximately 150° C. The reaction time at 115° C., is approximately 5 minutes but can range between 3 and 15 minutes depending on the temperature employed. The short reaction times make the process commercially attractive. Although formaldehyde and hydrogen cyanide should be provided in portions at least stoichiometrically sufficient to react the methylene diaminotetraacetonitrile to NTN an excess of formaldehyde and hydrogen cyanide is not detrimental to the reaction.

Another advantage of the present process is that at the temperature of the reaction the reaction system is a single phase system. As is known, NTN is only sparingly soluble in the reaction mixture below about 90° C. Between about 90° C. and 100° C. NTN becomes very soluble in the reaction medium so that when the reaction is conducted above 100° C. the NTN remains in solution in the reaction mixture. Since the reaction mixture is a single phase, the process can be readily adapted to a continuous commercial process which will not be troubled by the difficulties inherent in handling a slurry reaction mixture.

The mineral acid should be added in an amount sufficient to maintain the aqueous acid condition at pH in the reaction mixture below about 3 and preferably below about 2 and most preferably a pH between 0.5 and 1.0. The mineral acids useful in the present process must be capable of maintaining the pH below about 3 and must not react with the reactants or reaction products to form undesirable by-products. The preferred mineral acids are sulfuric and hydrochloric acid.

In order to illustrate the merits of the present invention, the following examples are provided:

EXAMPLE 1

In a 250 milliliter flask equipped with stirrer and thermometer, was added 101 grams of a 32 percent formaldehyde solution (1.25 moles). To this was added 30.3 grams (0.5 moles) of a 28 percent ammonia solution at 25° C. The ammonia was added at such a rate as to keep the temperature below 30° C. After the ammonia was added the reaction mixture was cooled to 5° C., where 12.5 grams (0.125 moles) of sulfuric acid in ten milliliters of water and 30 grams (1.1 mole) of liquid hydrogen cyanide was added. Form this homogeneous reaction mixture was taken 5.589 grams of the solution, and put into a 7 milliliter glass tube. The glass tube was sealed and then heated 5 minutes in a 75° C., oil bath. After the heating period the methylene diaminotetraacetonitrile which was formed precipitated from solution upon cooling to room temperature. The glass tube was opened when the contents were at 0° C. At this temperature 1.55 grams of a solution which contained 21 grams, (0.25 moles) of a 37 percent formaldehyde solution, 14 grams (0.52 moles of liquid hydrogen cyanide and 15 grams of water was added to the glass tube containing the methylene diaminotetraacetonitrile. The glass tube was sealed and then heated for 5 minutes at 116° C. The nitrilotriacetonitrile product obtained as a precipitate was analyzed to yield an 82 percent of that theoretical obtainable.

EXAMPLE 2

The procedure as outline in Example 1 was followed in its entirety except that the methylene diaminotetraacetonitrile was reacted with additional hydrogen cyanide and formaldehyde at a temperature of 120° C., for 5 minutes. The yield in this experiment was 81 percent.

EXAMPLE 3

The procedure as outlined in Example 1 was repeated in its entirety except the methylene diaminotetraacetonitrile was reacted with additional hydrogen cyanide and formaldehyde at 124° C. for five minutes. The yield was 81 percent.

EXAMPLE 4

The procedure as outline in Example 1 was repeated except that the methylene diaminotetraacetonitrile was reacted with additional hydrogen cyanide and formaldehyde at a temperature of 130° C. for 5 minutes. The yield was 83 percent.

What is claimed is:

1. A single phase process for manufacturing nitrilotriacetonitrile comprising:
   a. reacting under aqueous acid condition ammonia with formaldehyde and hydrogen cyanide provided in at least the stoichiometric portions required to react the ammonia to methylene diaminotetraacetonitrile at a pH between about 3 and 0.5 and a temperature between about 50° C. to 100° C. for a sufficient time to form a reaction mixture containing methylene diaminotetraacetonitrile;
   b. reacting methylene diaminotetraacetonitrile in the reaction mixture containing methylene diaminotetraacetonitrile under aqueous acid conditions at a temperature between about 100° C. and about 150° C. and under at least autogenous pressure with formaldehyde and hydrogen cyanide said formaldehyde and hydrogen cyanide provided in portions at least stoichiometrically sufficient to react the methylene diaminotetraacetonitrile to nitrilotriacetonitrile, to form nitrilotriacetonitrile.

2. The process of claim 1 wherein the nitrilotriacetonitrile is formed at a pressure between about 5 and about 100 pounds per square inch gauge.

3. The process of claim 1 comprising:
   a. reacting in a first reaction zone ammonia with formaldehyde and hydrogen cyanide provided in at least the stoichiometric portions required to react the ammonia to methylene diaminotetraacetonitrile at a pH between about 3 and 0.5 and a temperature between about 50° C. to 100° C. for a sufficient time to form a reaction mixture containing methylene diaminotetraacetonitrile;
   b. conveying the reaction mixture containing methylene diaminotetraacetonitrile to a second reaction zone;
   c. reacting methylene diaminotetraacetonitrile in the reaction mixture containing methylene diaminotetraacetonitrile under aqueous acid conditions at a temperature between about 100° C. and about 150° C. and under at least autogenous pressure with formaldehyde and hydrogen cyanide said formaldehyde and hydrogen cyanide provided in portions at least stoichiometrically sufficient to react the methylene diaminotetraacetonitrile to nitrilotriacetonitrile, to form nitrilotriacetonitrile.

4. The process of claim 3 wherein the pressure is maintained at from about 5 to about 100 pounds per square inch gauge.

5. The process of claim 1 wherein the methylene diaminotetraacetonitrile is reacted with formaldehyde and hydrogen cyanide for from about 3 to about 15 minutes.

6. The process of claim 1 wherein the methylene diaminotetraacetonitrile is reacted with formaldehyde and hydrogen cyanide in a molar ratio of formaldehyde to hydrogen cyanide of about 1:2.

7. The process of claim 3 wherein steps (a), (b) and (c) are carried out continuously.

8. The process of claim 1 wherein the mixture containing methylene diaminotetraacetonitrile is reacted with formaldehyde and hydrogen cyanide at a pH between about 3 and 0.5.

9. The process of claim 1 wherein the ammonia is reacted with the formaldehyde and hydrogen cyanide, at a pH between about 0.5 and 1 to form the mixture containing methylene diaminotetraacetonitrile, and the mixture containing methylene diaminotetraacetonitrile is reacted at a pH between about 0.5 and about 1.0 with the formaldehyde and hydrogen cyanide to form nitrilotriacetonitrile.

10. The process of claim 7 wherein the nitrilotriacetonitrile is formed at a pressure between about 5 and about 100 pounds per square inch gauge.

11. The process of claim 10 wherein the methylene diaminotetraacetonitrile is reacted with formaldehyde and hydrogen cyanide at a pH between about 3 and 0.5.

* * * * *